United States Patent
Laplume et al.

(10) Patent No.: US 12,537,796 B2
(45) Date of Patent: Jan. 27, 2026

(54) AUTOMATIC WEB APPLICATION FIREWALL (WAF) SECURITY SUGGESTER

(71) Applicant: Oracle International Corporation, Redwood Shores, CA (US)

(72) Inventors: Alexandre Vincent Laplume, Orlando, FL (US); Marcos Negreira, Coral Springs, FL (US); Leonid Kuperman, Toronto (CA); Michael Levin, Brooklyn, NY (US); Jorge Luis Espinoza Calderon, Heredia (CR)

(73) Assignee: Oracle International Corporation, Redwood Shores, CA (US)

( * ) Notice: Subject to any disclaimer, the term of this patent is extended or adjusted under 35 U.S.C. 154(b) by 3 days.

(21) Appl. No.: 17/129,582

(22) Filed: Dec. 21, 2020

(65) Prior Publication Data

US 2022/0200960 A1 Jun. 23, 2022

(51) Int. Cl.
*H04L 9/40* (2022.01)

(52) U.S. Cl.
CPC ...... *H04L 63/0263* (2013.01); *H04L 63/0281* (2013.01); *H04L 63/1433* (2013.01)

(58) Field of Classification Search
CPC ............. H04L 63/0263; H04L 63/0281; H04L 63/1433; H04L 63/029; H04L 29/06625; H04L 63/0218
See application file for complete search history.

(56) References Cited

U.S. PATENT DOCUMENTS

| | | | |
|---|---|---|---|
| 9,710,646 B1* | 7/2017 | Zhang | G06F 21/56 |
| 2005/0138413 A1* | 6/2005 | Lippmann | G06F 21/577 726/4 |
| 2007/0157288 A1* | 7/2007 | Lim | G06F 9/468 726/1 |
| 2008/0034424 A1* | 2/2008 | Overcash | H04L 63/1416 726/22 |
| 2009/0300748 A1* | 12/2009 | Diehl | H04L 63/0263 726/11 |
| 2011/0283359 A1* | 11/2011 | Prince | G06Q 30/0241 726/23 |

(Continued)

OTHER PUBLICATIONS

Torrano-Giménez, Camen, Alejandro Perez-Villegas, and Gonzalo Alvarez Maranon. "An anomaly-based approach for intrusion detection in web traffic." (2010). (Year: 2010).*

(Continued)

*Primary Examiner* — Jung W Kim
*Assistant Examiner* — Sameera Wickramasuriya
(74) *Attorney, Agent, or Firm* — Invoke

(57) ABSTRACT

Aspects of the present application relate to systems and methods for automated web-based filter tuning. The method can include receiving information characterizing a plurality of attributes of a web server and normalizing the received information. The method can include identifying a set of relevant tags to the web server via comparison of the normalized received information to data contained in a tag database, and forming a set of signatures relevant to the web server based at least in part on the set of relevant tags. The method can include receiving an administrator selection of at least some of the set of signatures, enabling the selected at least some of the set of signatures for filtering of received web requests.

31 Claims, 10 Drawing Sheets

(56) References Cited

U.S. PATENT DOCUMENTS

| | | | | |
|---|---|---|---|---|
| 2012/0324113 | A1* | 12/2012 | Prince | H04L 67/568 |
| | | | | 709/226 |
| 2014/0359749 | A1* | 12/2014 | Rieke | H04L 63/1433 |
| | | | | 726/11 |
| 2016/0127402 | A1* | 5/2016 | Veeramachaneni | |
| | | | | H04L 63/1416 |
| | | | | 726/23 |
| 2016/0182454 | A1* | 6/2016 | Phonsa | H04L 63/0263 |
| | | | | 726/11 |
| 2016/0191463 | A1* | 6/2016 | Mohanty | H04L 41/0803 |
| | | | | 726/11 |
| 2017/0034199 | A1* | 2/2017 | Zaw | H04L 63/0263 |
| 2017/0093824 | A1* | 3/2017 | Shulman | H04L 63/1433 |
| 2017/0169360 | A1* | 6/2017 | Veeramachaneni | G06N 7/005 |
| 2017/0250951 | A1* | 8/2017 | Wang | H04L 41/0869 |
| 2017/0302695 | A1* | 10/2017 | Zaw | H04L 63/1433 |
| 2021/0112032 | A1* | 4/2021 | DiRosa | H04L 63/0245 |

OTHER PUBLICATIONS

Gupta, Namit, Abakash Saikia, and D. Sanghi. "Web application firewall." Indian Institute of Technology, Kanpur 61 (2007) (Year: 2007).*

* cited by examiner

AUTOMATIC WEB APPLICATION FIREWALL (WAF) SECURITY SUGGESTER

BACKGROUND

A Web Application Firewall ("WAF") is a type of application firewall that can monitor, filter, and/or block HTTP traffic to and from a web service. A WAF can serve as a first line of defense at the edge and can prevent attacks exploiting a web application's known vulnerabilities. The function of a WAF is dependent on a set of policies that identify vulnerabilities and attack behaviors to identify, and actions to take when these are identified.

These policies, also called rules or signatures, can be tuned to match a desired protection level. In the event that these policies are tuned to be too stringent, then the function of the web application protected by the WAF can be adversely impacted. Similarly, if these policies are tuned to be too lax, then the security of the application protected by the WAF can be adversely affected.

Current tuning processes are very time intensive and demanding. Further, these current tuning processes do not scale well for use in an Internet environment. Accordingly, further development of WAFs and tuning are desired.

BRIEF SUMMARY

Aspects of the present disclosure relate to a method. The method can include receiving, by a first server, information characterizing a plurality of attributes of a web server, normalizing, by the first server, the received information, identifying a set of relevant tags to the web server via comparison of the normalized received information to data contained in a tag database, forming, with the first server, a set of signatures relevant to the web server based at least in part on the set of relevant tags, receiving an administrator selection of at least some of the set of signatures, and enabling the selected at least some of the set of signatures for filtering of received web requests.

In some embodiments, the first server can be a reverse proxy server. In some embodiments, the method can further include filtering a received web request with a Web Application Firewall ("WAF") based on at least some of the set of signatures. In some embodiments, the reverse proxy server can include the WAF. In some embodiments, the web server can be an application server.

In some embodiments, the method can include scanning with the first server the web server to generate the information characterizing the plurality of attributes of the web server. In some embodiments, normalizing the received information can include parsing the received information into a plurality of phrases. In some embodiments, identifying the set of relevant tags to the web server via comparison of the normalized received information to data contained in the tag database includes comparing at least some of the plurality of phrases to data contained in the tag database. In some embodiments, at least one of the tags in the set of relevant tags represents a security vulnerability.

In some embodiments, forming the set of signatures relevant to the web server based at least in part on the set of relevant tags includes identifying a set of signatures corresponding to at least some of the set of relevant tags. In some embodiments, the set of signatures corresponding to at least some of the set of relevant tags are identified through application of rules defining criteria for determining a match to the set of relevant tags.

In some embodiments, the method includes filtering the set of signatures relevant to the web server based at least in part on the set of relevant tags according to administrator provided criteria. In some embodiments, the administrator provided criteria identify at least one of: a signature accuracy level; a signature maturity level; and a signature filtering level.

In some embodiments, filtering the set of signatures corresponding to at least some of the set of relevant tags includes disabling at least some of the signatures in the set of signatures corresponding to at least some of the set of relevant tags. In some embodiments, enabling the selected at least some of the set of signatures for filtering of received web requests includes storing the enabled signatures on a signature database, wherein the signature database is accessible by a Web Application Firewall ("WAF").

One aspect of the present disclosure relates to a non-transitory computer-readable storage medium storing a plurality of instructions executable by one or more processors. The plurality of instructions when executed by the one or more processors cause the one or more processors to receive information characterizing a plurality of attributes of a web server, normalize the received information, identify a set of relevant tags to the web server via comparison of the normalized received information to data contained in a tag database, form a set of signatures relevant to the web server based at least in part on the set of relevant tags, receive an administrator selection of at least some of the set of signatures, and enable the selected at least some of the set of signatures for filtering of received web requests.

In some embodiments, the plurality of instructions when executed by the one or more processors further cause the one or more processors to filter a received web request based on at least some of the set of signatures.

One aspect of the present disclosure relates to a system. The system can include a memory including executable instructions, and a server that can execute the instructions in the memory to receive information characterizing a plurality of attributes of a web server, normalize the received information, identify a set of relevant tags to the web server via comparison of the normalized received information to data contained in a tag database, form a set of signatures relevant to the web server based at least in part on the set of relevant tags, receive an administrator selection of at least some of the set of signatures, and enable the selected at least some of the set of signatures for filtering of received web requests.

In some embodiments, the server can be a reverse proxy server and can include a Web Application Firewall ("WAF"). In some embodiments, the server can further execute the instructions in the memory to filter a received web request with the WAF based on at least some of the set of signatures.

Various embodiments are described herein, including methods, systems, non-transitory computer-readable storage media storing programs, code, or instructions executable by one or more processors, and the like.

The foregoing, together with other features and embodiments will become more apparent upon referring to the following specification, claims, and accompanying drawings.

DETAILED DESCRIPTION

Figure 1:
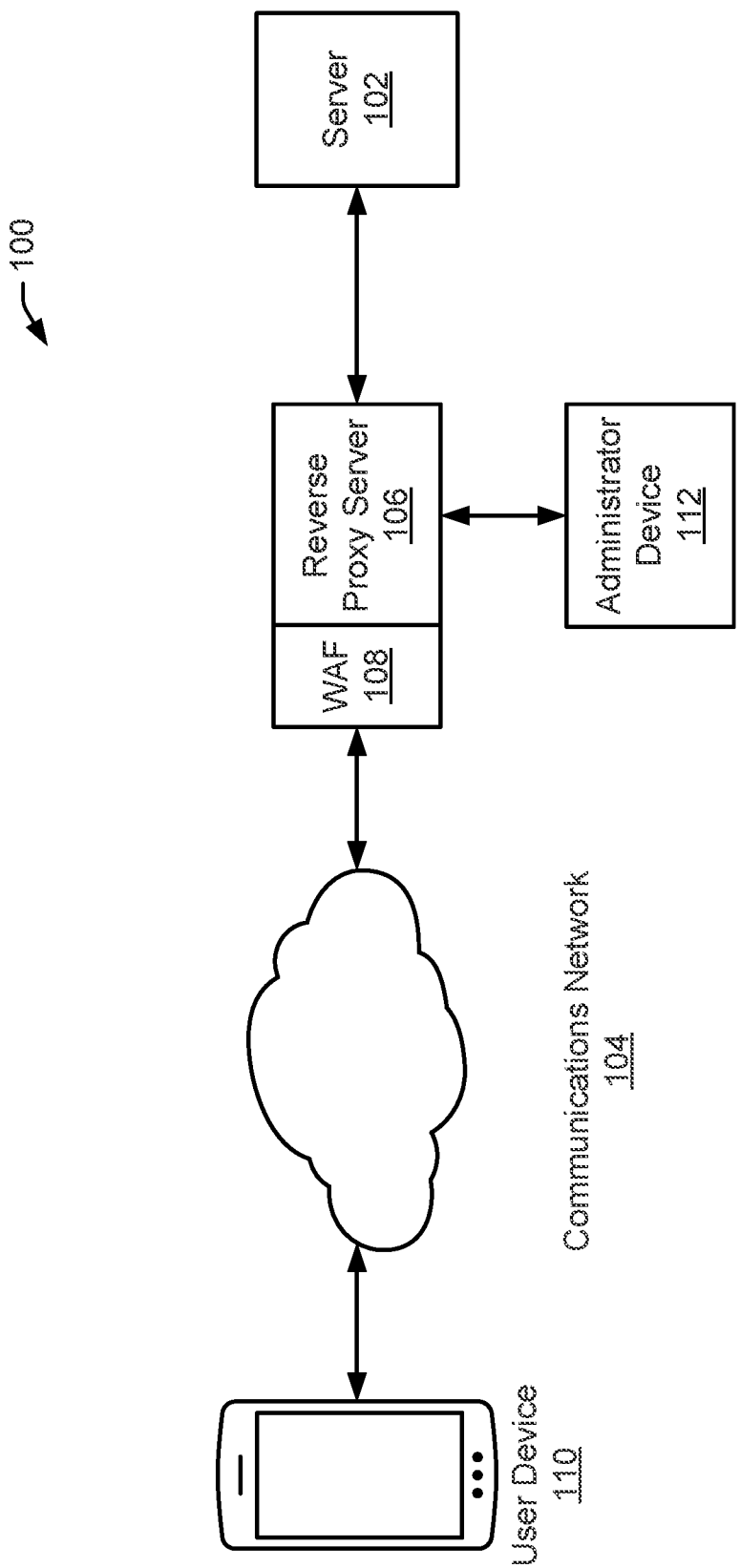
FIG. 1 is a schematic illustration of one embodiment of an automated security system.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Cyber security is of increasing importance as more of life is connected to computers and to computing networks. Cyber security is the protecting of computers, servers, mobile devices, electronic systems, networks, and data from malicious attacks. Some aspects of cyber security relate to the use of a firewall, and specifically to the use of a web application firewall ("WAF").

A firewall is a network security system that uses predetermined security rules to control incoming and outgoing network traffic. A WAF is a specific type of application firewall that filters traffic to and from a web service. A WAF compares incoming traffic to a policy comprising a plurality of signatures. Based on the results of that comparison, the WAF can block traffic, modify traffic, and/or allow traffic to pass.

While WAFs can be effective in facilitating cyber security, WAFs can also present challenges. Specifically, setting up a WAF to provide a desired level of filtering is time consuming. This setup occurs in a tuning process in which a WAF analyst enables a set of rules and modifies these rules or a sensitivity of the rules to achieve a desired level of filtering. As used herein, tuning is the process whereby an analyst modifies signatures and associated actions to modify protection of an application server. If the WAF is tuned improperly, the WAF may block non-malicious traffic which can disrupt the operation of the web service, or alternatively may not block malicious traffic.

Some aspects relate to the automation of all or portions of this tuning. This automation can improve the consistency and accuracy of WAF tuning, thereby consistently achieving a desired security level. Further, this automation can decrease the amount of time required for tuning and making tuning more efficient.

For example, one exemplary aspect of the present disclosure relates to the a method for automatically tuning a WAF. This method includes the auto generation of data relating to an application server. This data is then normalized and used to identify one or several tags that are then correlated to one or several signatures. Based on user attribute information, the selected signatures can be modified and/or filtered. For example, some or all of the signatures may be associated with a value that characterizes a level of filtering provided by that signature, in other words characterizes how strictly the signature filters. In some embodiments, and based on user attributes, signatures can be unselected based on their level of filtering, or in other words, signatures can be removed from the set of selected signatures if their filtering is, for example, too high or too low.

In some embodiments, these signatures can be enabled and can be used to filter incoming and/or outgoing communications with the application server. In some embodiments, these signatures can be recommended to the user, and feedback can be received from the user. This feedback can, in some embodiments, modify the set of selected signatures. This can include, for example, select one or several of the signatures for enabling. Based on this feedback, one or several signatures are enabled, and can then be used to filter incoming or outgoing communication with the application server.

With reference now to FIG. 1, a schematic illustration of one embodiment of an automated security system 100, also referred to herein as a communication system 100 is shown. The communication system includes a server 102 which can be a Web server and/or an application server. The server 100 to can communicate with a communication network 104 via a reverse proxy server 106. The communication network 104 can comprise a telecommunications network, and in some embodiments, can comprise plurality of nodes interconnected by links that are used to exchange messages between the nodes. In some embodiments, some or all of the links can comprise physical links, such as a wire or fiber optic link, and in some embodiments, some or all of the links can comprise wholly or partially wireless links such as via, for example, a cellular network.

The reverse proxy server 106 can comprise a hardware device such as a server that sits between the communication network 104 and the server 102. The reverse proxy server 106 can receive communications, and specifically can receive HTTP requests, destined for the server 102 and can pass some or all of those communications to the server 102 or can respond on behalf of the server 102. In some embodiments, the reverse proxy server 106 can intercept communications destined for the server 102 at the network edge.

The reverse proxy server 106 can include a Web Application Firewall ("WAF") 108. In some embodiments, the WAF 108 can be a layer 7 reverse proxy that can inspect HTTP traffic for monitoring and/or blocking traffic based on signatures forming a policy. The WAF uses a signature to match against elements of the HTTP request including, but not limited to, HTTP headers, URI, or URL parameters. If a match is found, then an action can be taken such as alerting or blocking. If no match is found, then the HTTP transaction proceeds as normal to the application server.

As used herein, a signature is a rule identifying a characteristic corresponding to the signature, a location for that characteristic to be identified, and an action to be taken if that characteristic when that characteristic is identified. In some embodiments, this action can be taken in a HTTP transaction. As used herein, a policy is a collection of signatures, signature tags, and any other metadata used by the WAF to monitor and/or block communications. This policy can include information identifying how the WAF determines when a signature is matched, where to match a signature, what action to take when a signature is matched, and/or where and how to the log matches.

The WAF 108, which will be discussed at greater length below, can evaluate communications destined for the server 102 and can filter those communications. In some embodiments, this filtering can be performed according to the set of signatures that together can form the policy. In some embodiments, the WAF 108 can comprise a distinct hardware component, and in some embodiments, and as shown in FIG. 1, the WAF 108 can reside on the reverse proxy server 106.

A device, which can be a user device 110 communicates via the WAF 108, and in some embodiments via of the WAF 108 on the reverse proxy server 106 with the server 102. The user device 110 can be any computing device capable of communicating across the communications network 104. Such devices can include, for example, a server, a personal computer, laptop, tablet, a smart phone, smartglasses, a smartwatch, a wearable, or the like.

In some embodiments, the system 100 can include an administrator device 112. The administrator device can be coupled, and specifically communicatively coupled to the reverse proxy server 106. In some embodiments, the administrator device 112 can be configured to allow an administrator to modify one or several aspects of the tuning of the WAF 108, and specifically to enable the selection and/or deselection of one or several signatures. The administrator device 112 can comprise a computing device such as, for example, a server, a personal computer, laptop, tablet, a smart phone, or the like.

Figure 2:
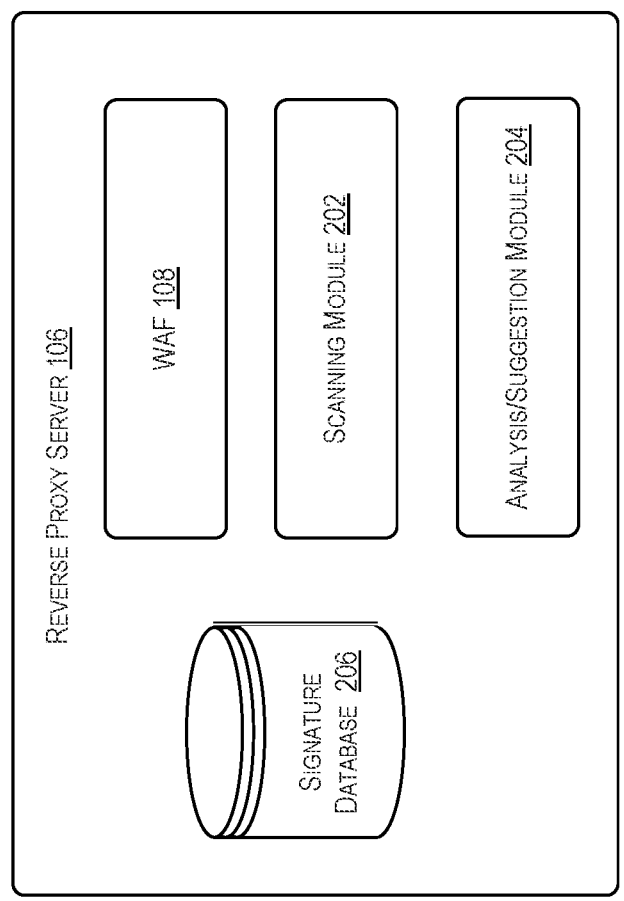
FIG. 2 is a schematic illustration of one embodiment of the reverse proxy server.

With reference to the FIG. 2, schematic illustration of one embodiment of the reverse proxy server 106 is shown. The reverse proxy server 106 can include the WAF 108, a scanning module 200 to, an analysis/suggestion module 204, and/or a signature database 206. Although all of these modules are depicted as co-located on the reverse proxy server 106 some or more of these modules can be located on other servers. For example, in some embodiments, the WAF 108 can be located on the first server, which first server can be the reverse proxy server 106, and one or both of the scanning module 202 and the analysis/suggestion module 204 can be located in a second server. In some embodiments, the signature database 206 can be located on the same server as the WAF 108, and in some embodiments, the signature database 206 can be located on the same server as one or both of the scanning module 202 and the analysis/suggestion module 204. In some embodiments, and even when located on different servers, the WAF 108 is communicatively coupled with the signature database 206.

The scanning module 202 can be configured to interact with the server 102, and specifically to scan the server 102. This scanning can come in some embodiments, include the querying of the server 102 for information relating to one or several hardware and/or software attributes of the server 102. In some embodiments, these attributes can include, for example, identification of: hardware components in the server 102; one or several configurations of the server 102 and/or of hardware components in the server 102; software operating on the server 102 and/or on hardware components of the server 102; or the like. In some embodiments, this scanning of the server 102 can be specific to an application running on the server, and thus this scan can generate and/or retreat attributes of that application.

The analysis/suggestion module 204 can receive this information relating to the attributes of the server 102 and can manipulate and/or analyze this information. In some embodiments, this can include normalizing this information and identifying one or several tags corresponding to this information. Based on these one or several tags, the analysis/suggestion module 204 can identify one or several corresponding signatures, and then filter these one or several corresponding signatures according to some embodiments, one or several user attributes or one or several protection attributes. These signatures identified by the analysis/suggestion module 204, in some embodiments before filtering, and in some embodiments after filtering, can be stored in the signature database 206.

In some embodiments, the analysis/suggestion module 204 can further recommend one or several signatures for enablement to an administrator controlling the WAF 108. In response to this request, the analysis/suggestion module 204 can receive one or several user inputs which can identify one or several of the recommended signatures for enabling, identify one or several of the recommended signatures for disabling, add one or several previously on recommended signatures for enabling, and/or modify one or several attributes of one or several of the recommended signatures. Based on this user input, the analysis/suggestion module 204 can generate and enable a final policy for the WAF 108. This final policy can be stored in the signature database 206.

Figure 3:
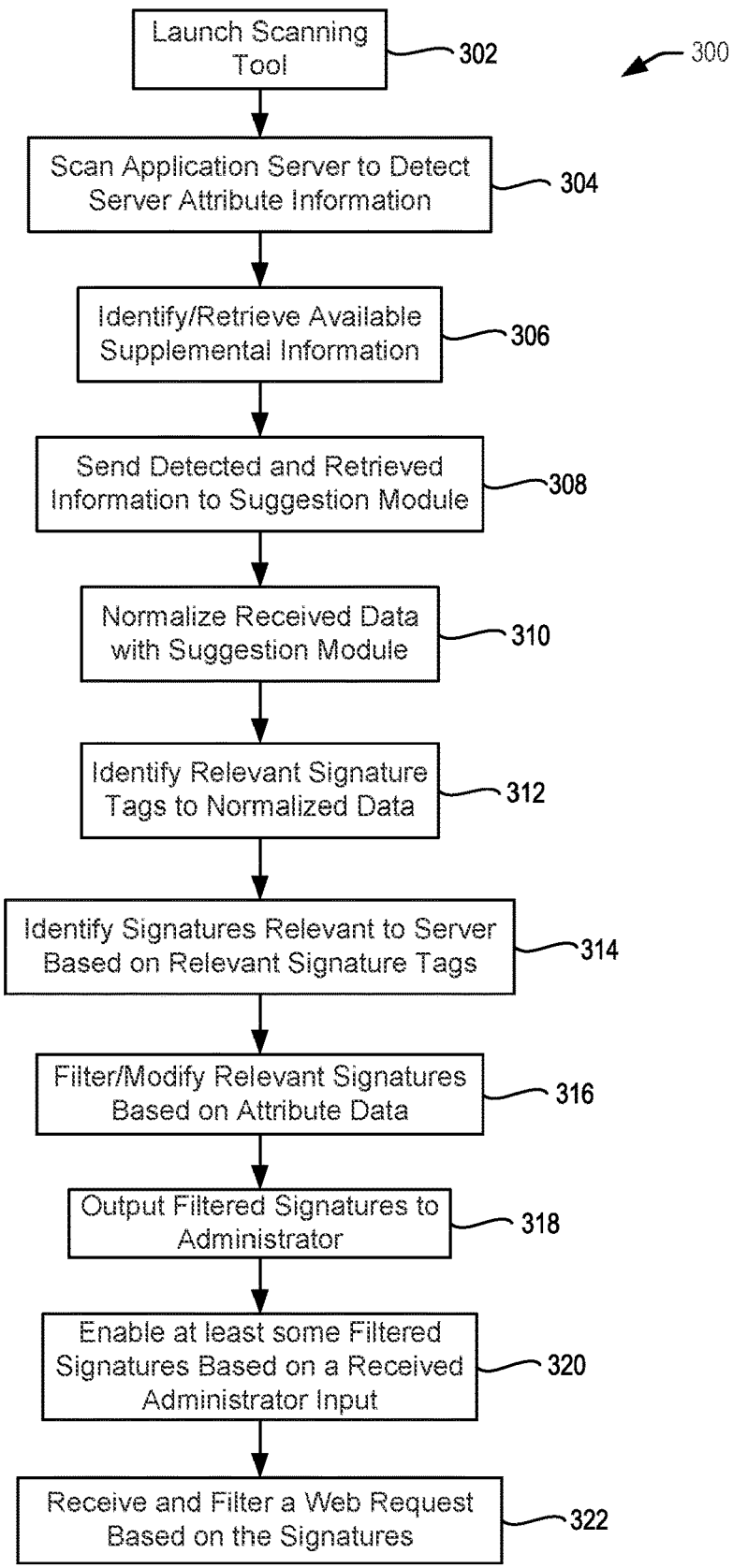
FIG. 3 is a flowchart illustrating one embodiment of a process for automated security suggestion.

With reference now to FIG. 3, a flowchart illustrating one embodiment of a process 300 for automated security suggestion is shown. The process can be performed by all or portions of the system 100. In some embodiments, the process 300 can be performed by the reverse proxy server 106 and/or by some or all of: the WAF 108; the scanning module 202; and the analysis/suggestion module 204. The process 300 begins at block 302 wherein the scanning module 202 is launched. In some embodiments, the launch of the scanning module 202 can include the launch of the scanning tool within the scanning module 202.

At block 304, the server 102 is scanned to detect server attribute information. In some embodiments, the server 102, which can be the application server, is scanned by the scanning module 202, and specifically, in some embodiments, by the scanning tool. This scanning of the server 100 to can include the determination of one or several attributes of the server 102 and/or of one or several modules of the server 102. In some embodiments, this can include sending a request to the server 102 for self-identification of attributes of the server 102. The server 102 can then return information identifying these requested attributes. In some embodiments, this can include determining a server version (e.g. Apache/2.4.18 (Ubuntu)), an application version, deployed technologies, arguments used, or the like.

At block 306, supplemental information is identified and/or retrieved. In some embodiments, for example, the system administrator can provide information for use in connection with attribute information generated by the scanning tool. This supplemental information can relate to one or several attributes relevant to the application server and/or to the desired filtering that are not discoverable via the scanning of the server. In some embodiments, the identification retrieval of supplemental information can be performed by the scanning module 202. The supplemental information can be identified in memory accessible by the scanning module 202, including, for example, on the server containing the scanning module 202.

At block 308 the information generated and/or detected in block 304 and/or identified and retrieved in block 306 is sent to the analysis/suggestion module 204. At block 310 the analysis/suggestion module 204 normalizes the received data. In some embodiments, this normalization can include the collection of all of the data sent in block 306 and the translation of this data into one or several tags. This can include, for example, parsing the received information into one or several phrases, with words, word groups, or the like. In some embodiments, parsed portions of the received information can then be matched to one or several tags, which tags can be stored in, for example, the signature database 206. In some embodiments, a tag can represent an aspect of the attribute data, a security weakness associated with an aspect of the attribute data such as, for example, a vulnerability identified in National Institute of Standards and Technology's list of common vulnerabilities and exposures, or the like. In some embodiments, and as indicated in block 312, a tag can be identified as relevant to the normalized data when a match between a parsed portion of the data received in block 306 and a portion of a tag is identified.

At block 314, signatures relevant to the server 102 are identified based on the tags identified in block 312. In some embodiments, this can include forming a set of signatures relevant to the server. In some embodiments, the identification of the signatures based on the tags identified can be performed by the analysis/suggestion module 204. In some embodiments, this can be performed according to one or several rules defining criteria for determining a match. In some embodiments, these can be global rules applying to all signatures, and in some embodiments these can be rules applying to a subset of all of the signatures such as one or several of the signatures. In some embodiments, for example, these rules may specify that a match between tags associated with a server 102 and a signature is identified when at least a minimum number of tags associated with the server 102 are also associated with a signature, when a certain one or several tags are associated with the server 102, and/or when tags associated with the server 102 represent one or several predetermined tag categories associated with the signature.

At block 316, the relevant signatures are filtered and/or the set of relevant signatures is modified. In some embodiments, this filtering can include reducing the set of relevant signatures, and in some embodiments this modifying of the set of relevant signatures can include reducing or increasing the number of signatures in the set of relevant signatures. In some embodiments, this filtering can include the applying of one or several administrator identified criteria to the signatures identified in block 314 as relevant to the normalized data. In some embodiments, for example, an administrator may identify a filtering level and/or a risk level associated with the environment in which the WAF 108 will be used, a signature maturity, and/or a signature accuracy. Based on this information, some of the signatures identified in block 314 may be excluded. For example, if the administrator identifies the risk of the environment in which the WAF 108 operates as at a first level, and one of the signatures identified in block 314 is associated with a higher risk level, than that signature may be excluded as being to protected. In some embodiments, it may be desirable to exclude signatures that too strictly filter so as to prevent the inadvertent blocking or filtering of non-malicious traffic to the server. This filtering can be performed by the analysis/suggestion module 204.

In some embodiments, the administrator identified criteria may result in the addition of one or several signatures to the set of signatures relevant to the server. For example, if the administrator defines a high level of filtering and/or a high risk environment, additional signatures may be identified for addition to the set of signatures relevant to the server. These additional signatures may be identified solely based on the administrator identified criteria, or based on a combination of the administrator identified criteria and one or several of the tags relevant to the server.

At block 318, the filtered set of signatures, or in other words, the set of signatures from block 316 are outputted to the administrator. In some embodiments, the analysis/suggestion module 204 can output the filtered set of signatures to the administrator. In some embodiments, this can be in the form of a list, which list can identify the signatures in the set of filtered signatures, tags associated with that signature, a brief description of the signature, a filtering level of the signature, or the like. In some embodiments, the analysis/suggestion module 204 can output the filtered set of signatures to the administrator by sending a communication comprising the filtered set of signatures to an administrator device, which administrator device can be any computing device configured to allow the administrator to communicate with the analysis/suggestion module 204.

The analysis/suggestion module 204 can receive a response from the administrator via the administrator device 112. This response can identify one or several signatures for enabling, one or several signatures for disabling, and/or one or several signatures for modifying. Based on this received response, signatures can be enabled, disabled, and/or modified, and the policy comprising the enabled signatures can be finalized as indicated in block 320. This policy, and thus the enabled signatures can be stored in the signature database 206. In some, and as depicted in block 322, this policy can be used to block and/or filter a received web request. Specifically, a web request can be received by the WAF 108, and in some embodiments by the reverse proxy server 106. The WAF 108 can analyze the received web request to see if all or portions of the received web request matches on any of the signatures forming the policy stored in the signature database 206. If it is determined that the web request matches on one or several signatures, then the action of those one or several signatures is applied to the web request by the WAF 108. In some embodiments, this can include filtering and/or blocking a received web request with the WAF 108 based on at least some of the set of signatures stored in the signature database 206 and forming the policy.

Figure 4:
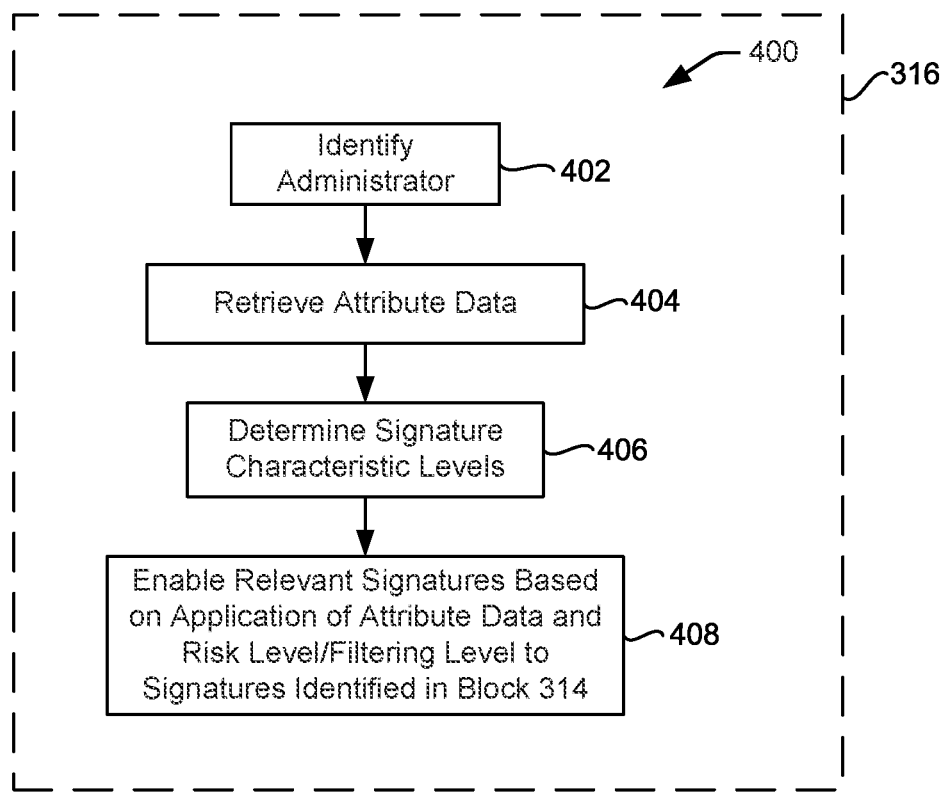
FIG. 4 is a flowchart illustrating one embodiment of a process for signature filtering.

With reference now to FIG. 4, a flowchart illustrating one embodiment of a process 400 for signature filtering is shown. The process 400 can be performed as a part of, or in the place of the step of block 316 of FIG. 3. The process 400 begins at block 402, wherein the administrator is identified. In some embodiments, this can include identifying the account associated with the WAF 108.

After the administrator has been identified, the process 400 proceeds to block 404, wherein attribute data is retrieved. In some embodiments, the attribute data can be associated with the WAF 108 and/or with the administrator. In some embodiments, this attribute data can identify a risk level of the environment in which the WAF 108 will operate and/or the filtering level for the policy, a desired maturity level for signatures in the policy, and/or an accuracy level for the signature.

At block 406, one or several signature characteristic levels of the one or several signatures identified in block 314 are determined. In some embodiments, this can include extracting metadata from some or all of these signatures, this metadata identifying the characteristic levels of the signatures. In some embodiments, this metadata can identify, for example, a revision of the signature, an accuracy level of the signature, a maturity of the signature, and/or a severity of the signature. This identification of the signature characteristic levels can be performed by, for example, the analysis/suggestion module 204.

At block 408 the attribute data, and thus the risk level and/or filtering level is applied to the signatures identified in block 314. In some embodiments, this can include identifying one or several signatures that have a revision, accuracy, maturity, and/or severity that do not correspond with revision, accuracy, maturity, and/or severity levels specified in the attribute data received in block 404. This can include, for example, determining if a signature is for a risk level and/or provides a filtering level not corresponding to the risk level and/or filtering level specified in the attribute data. This can include, for example, identifying one or several signatures that too strictly filter and/or that too loosely filter, that are too inaccurate, and/or that do not meet maturity requirements. In some embodiments, signatures providing these desired levels can be enabled, whereas signatures that do not provide a desired level can be disabled. In some embodiments, the application of the attribute data can further include the modification of one or several attributes of one or several signatures. This can include, for example, modifying a filtering level and/or risk level of a signature.

Figure 5:
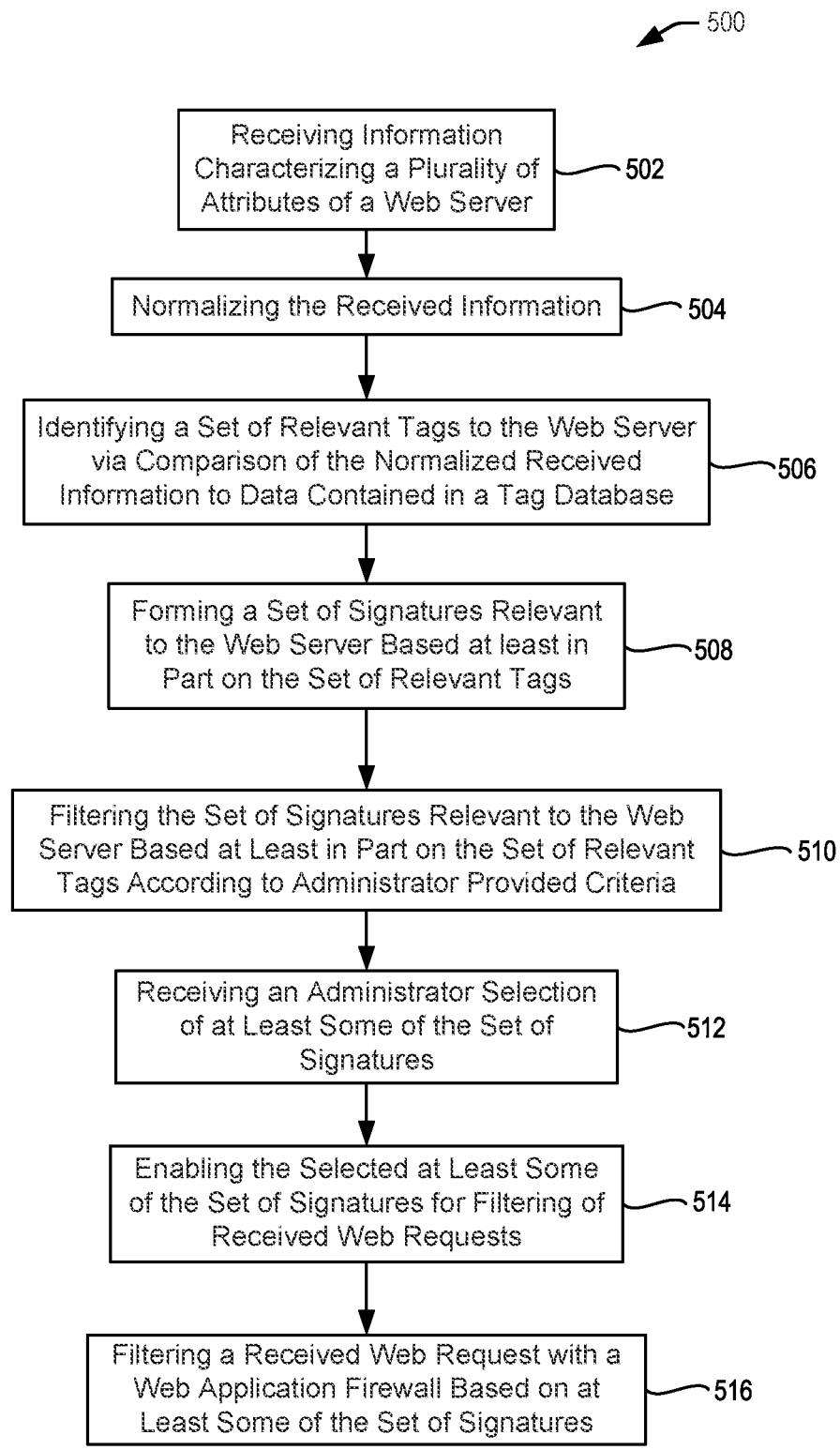
FIG. 5 is a flowchart illustrating another embodiment of a process for automated security suggestion.

With reference now to FIG. 5, a flowchart illustrating another embodiment of a process 500 for automated security suggestion. The process 500 can be performed by all or portions of the system 100. In some embodiments, the process 500 can be performed by the reverse proxy server 106 and/or by some or all of: the WAF 108; the scanning module 202; and the analysis/suggestion module 204.

The process 500 begins at block 502, wherein information characterizing a plurality of attributes of the server 102, which can be a web server, is received. In some embodiments, this information can be received by a server such as the reverse proxy server 106, which reverse proxy server 106 can include the WAF 108. In some embodiments, the receipt of this information can include scanning the server 102 with a server such as the reverse proxy server 106 to generate the information characterizing the plurality of attributes of the server 102.

At block 504, the received information is normalized. In some embodiments, normalizing the received information can include parsing the received information into a plurality of phrases. At block 506, a set of relevant tags to the web server are identified. In some embodiments, these can be identified via comparison of the normalized received information to data contained in a tag database. In some embodiments, identifying the set of relevant tags to the web server via comparison of the normalized received information to data contained in the tag database can include comparing at least some of the plurality of phrases to data contained in the tag database. In some embodiments, at least one of the tags in the set of relevant tags represents a security vulnerability.

At block 508, a set of signatures is formed. The signatures in the set of signatures are relevant to the server 102. This set of signatures is formed based at least in part on the set of relevant tags. In some embodiments, forming this set of signature includes identifying a set of signatures corresponding to at least some of the set of relevant tags. In some embodiments, this set of signatures is formed through application of rules defining criteria for determining a match to the set of relevant tags, and in some embodiments, this set of signatures is formed based at least in part on the set of relevant tags according to administrator provided criteria.

At block 510, the set of signatures corresponding to at least some of the set of relevant tags are filtered. This filtering can include, filtering the set of signatures according to administrator provided criteria. These administrator provided criteria can identify at least one of: a signature accuracy level; a signature maturity level; and a signature filtering level. In some embodiments, this filtering can include, for example, disabling at least some of the signatures in the set of signatures corresponding to at least some of the set of relevant tags.

At block 512, an administrator selection of at least some of the set of signatures is received. This can include sending the set of signatures to the administrator for review and/or approval, and receiving a communication from the administrator, the communication including a selection of at least some of the set of signatures for enabling. At block 514, the selected at least some of the set of signatures for filtering of received web requests are enabled. In some embodiments, enabling the selected at least some of the set of signatures for filtering of received web requests includes storing the enabled signatures on a signature database, wherein the signature database is accessible by a Web Application Firewall ("WAF")At block 516, a received web request is filtered with a Web Application Firewall ("WAF") based on at least some of the set of signatures.

EXAMPLE IMPLEMENTATION

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
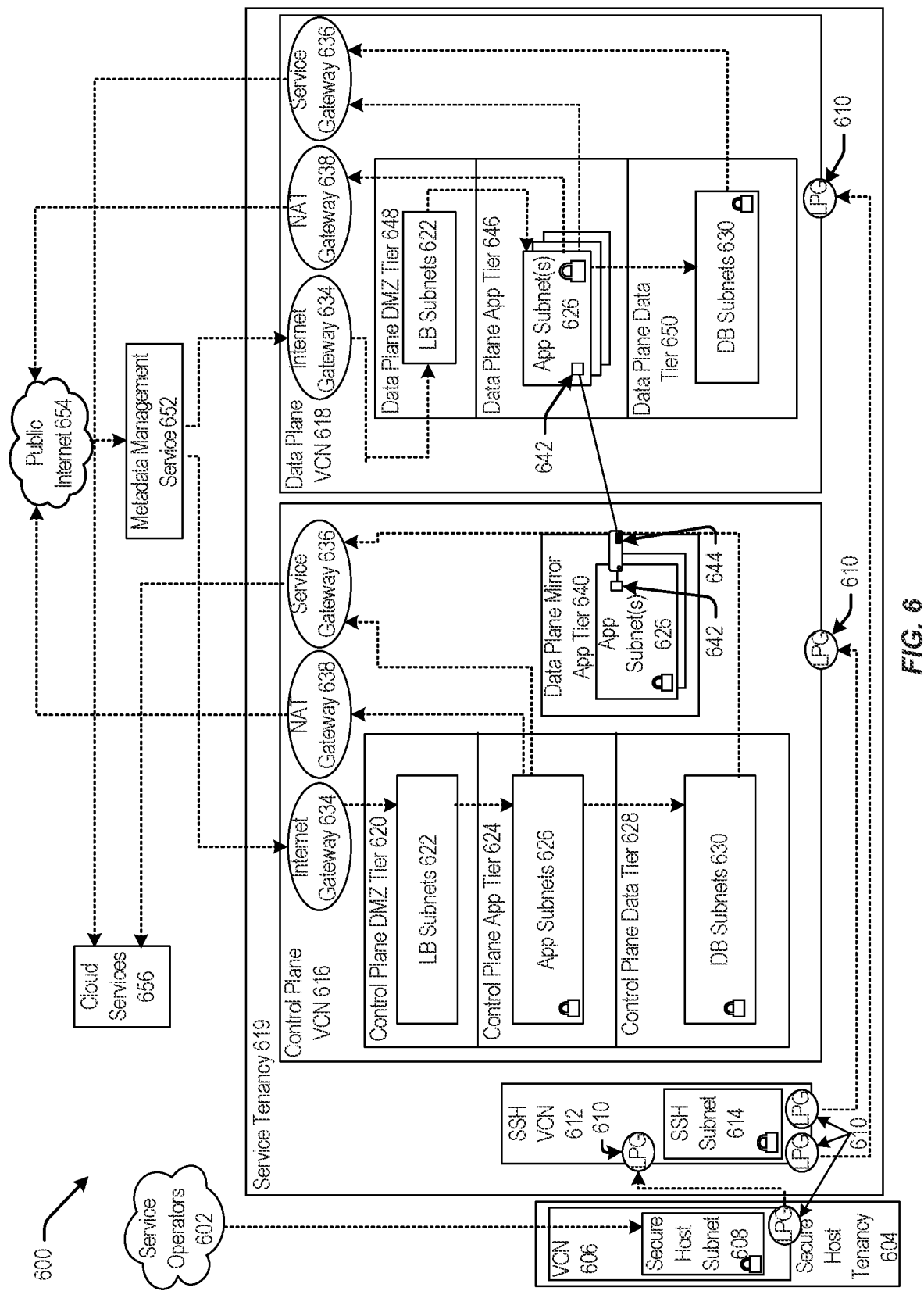
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plan VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
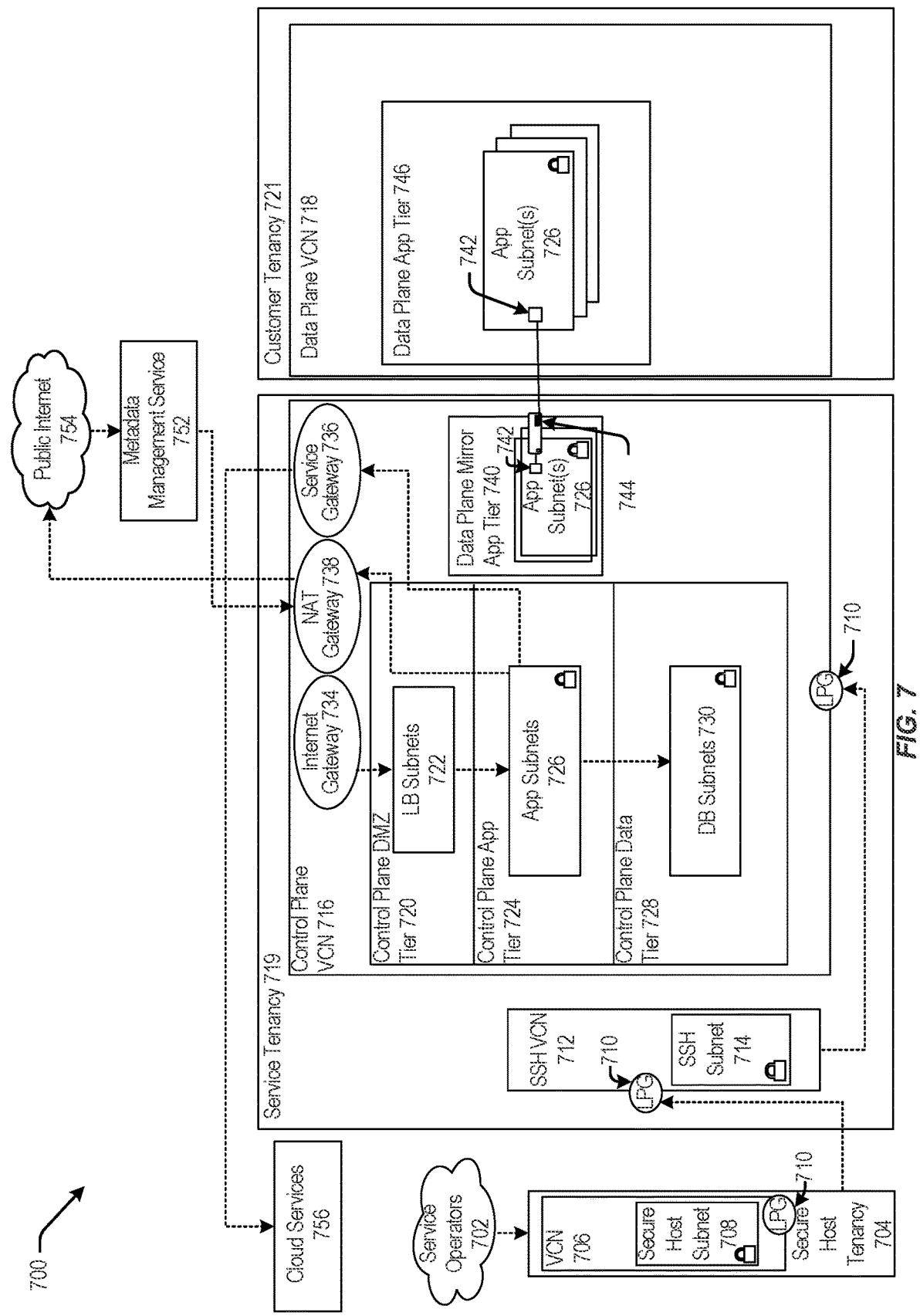
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726726. The app subnet(s) 726726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726726 of the data plane mirror app tier 740 and the app subnet(s) 726726 that can be contained in a data plane app tier 746 (e.g. the data plane app tier 646 of FIG. 6) via the VNIC 742 contained in the data plane mirror app tier 740 and the VNIC 742 contained in the data plan app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 1," may be located in Region 1 and in "Region 2." If a call to Deployment 1 is made by the service gateway 736 contained in the control plane VCN 716 located in Region 1, the call may be transmitted to Deployment 1 in Region 1. In this example, the control plane VCN 716, or Deployment 1 in Region 1, may not be communicatively coupled to, or otherwise in communication with, Deployment 1 in Region 2.

Figure 8:
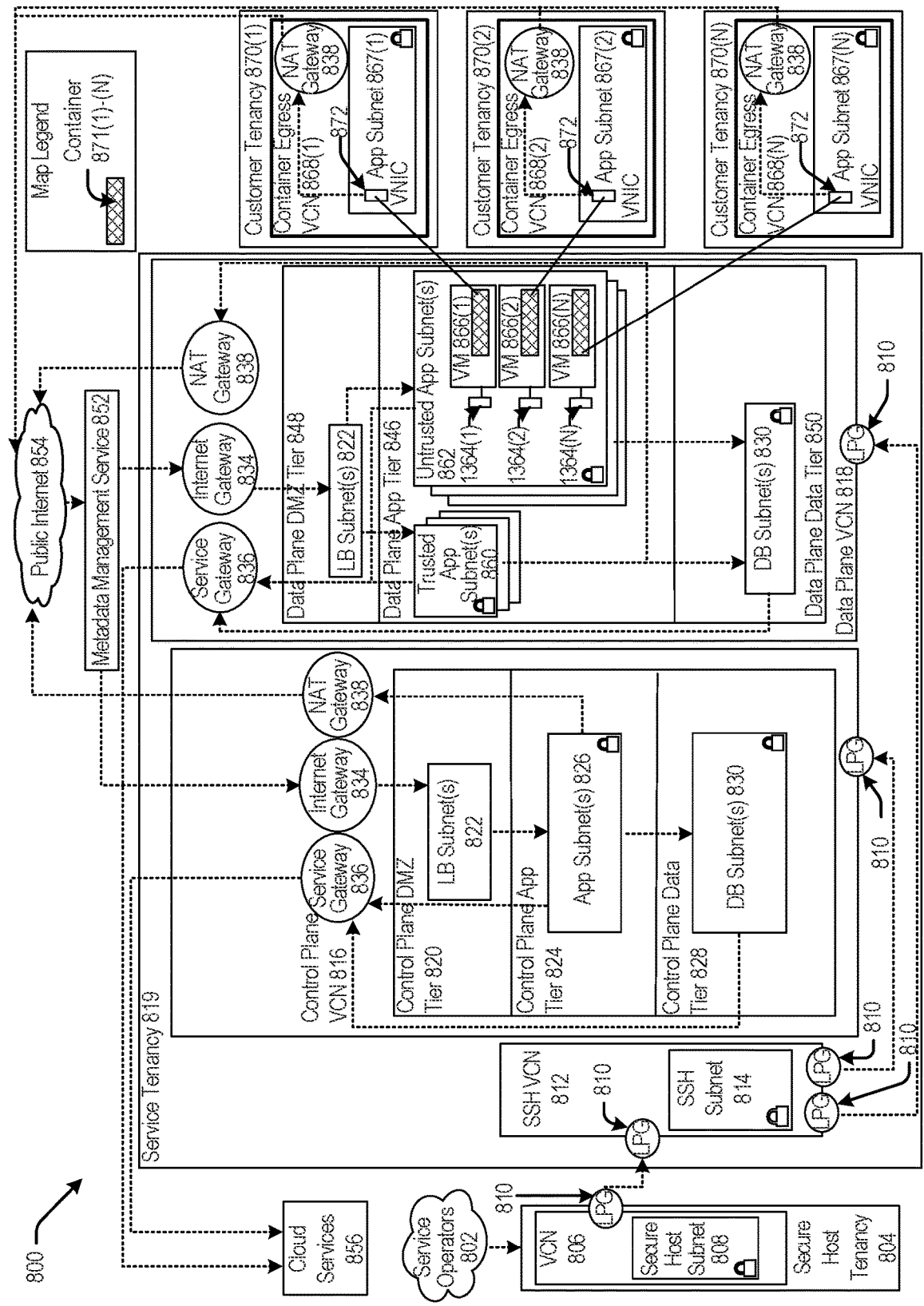
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
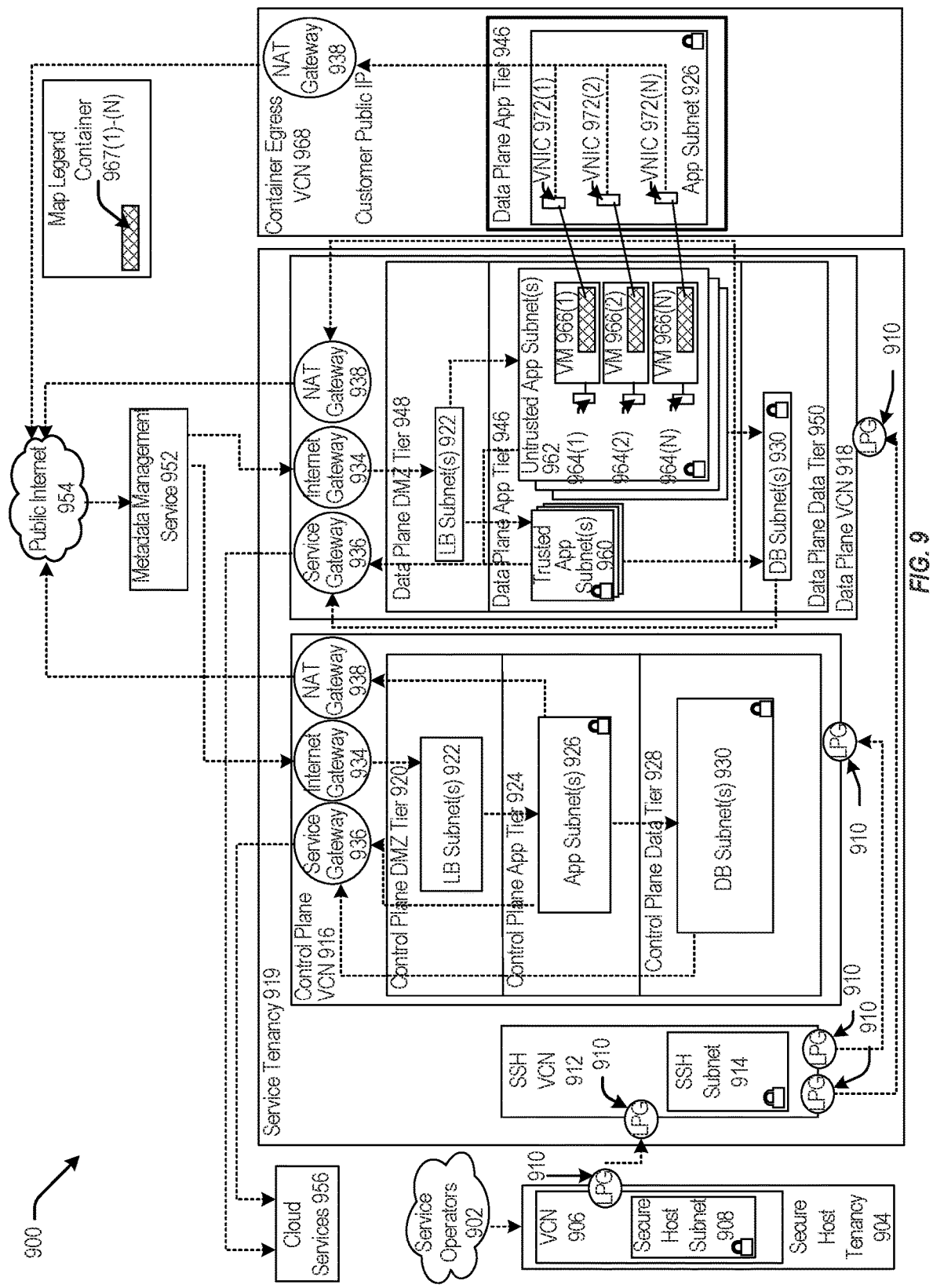
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
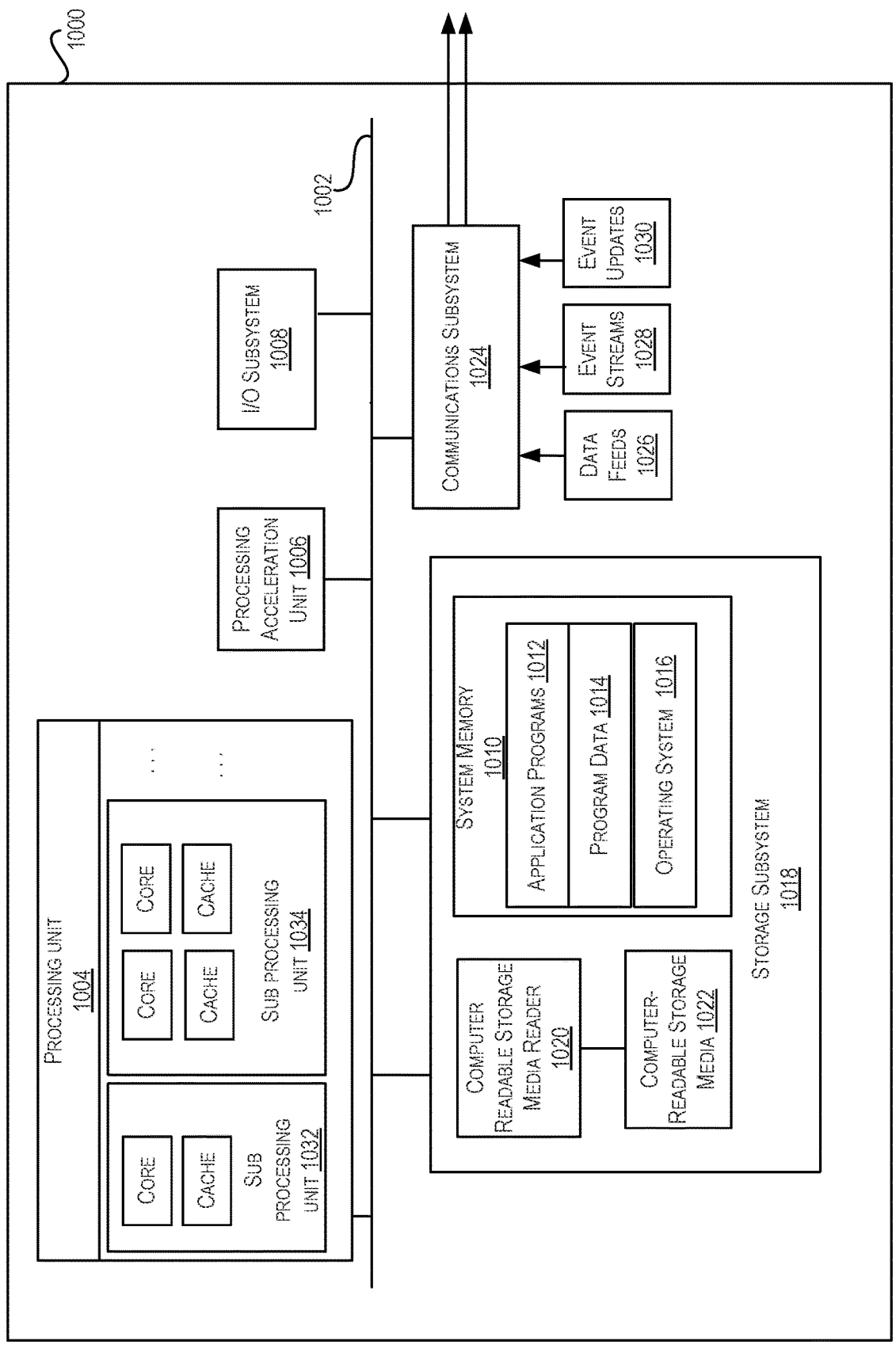
FIG. 10 is a block diagram illustrating an example computer system, according to at least one embodiment.

FIG. 10 illustrates an example computer system 1000, in which various aspects of the present disclosure may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 100S, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein. In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a first server, a set of web server information comprising one or more configurations of the web server and/or one or more hardware components of the web server;
   subsequent to receiving the set of web server information:
   normalizing, by the first server, the set of web server information to generate normalized web server information;
   identifying a plurality of tags relevant to the web server via a comparison of the normalized web server information to tag data contained in a tag database;
   determining that a minimum threshold number of tags, greater than one, associated with the web server are also associated with a particular firewall signature;
   responsive at least to determining that the minimum threshold number of tags associated with the web server are also associated with the particular firewall signature: forming, by the first server, a signature set comprising the particular firewall signature;
   receiving an administrator selection of at least one signature of the signature set; and
   enabling the at least one signature of the signature set for filtering of received web requests.

2. The method of claim 1, wherein the first server comprises a reverse proxy server, and further comprising filtering a received web request with a Web Application Firewall (WAF) based on at least a portion of the signature set.

3. The method of claim 1, wherein the first server comprises a reverse proxy server that includes a Web Application Firewall (WAF), wherein the web server comprises an application server, and further comprising filtering a received web request with the WAF based on at least a portion of the signature set.

4. The method of claim 1, further comprising scanning with the first server the web server to generate a portion of the set of web server information.

5. The method of claim 1, wherein the normalizing and the identifying comprise parsing the set of web server information into word phrases and matching the word phrases to tags of the plurality of tags.

6. The method of claim 5, wherein the normalizing comprises parsing the set of web server information into word phrases and matching the word phrases to tags of the plurality of tags into a plurality of word phrases, and wherein the identifying comprises comparing at least some of the plurality of word phrases to data in the tag database, and wherein a tag in the tag database represents a security weakness associated with the web server.

7. The method of claim 1, wherein at least one tag in the plurality of tags represents a security vulnerability.

8. The method of claim 1, wherein the forming comprises identifying a particular signature set corresponding to at least some of the plurality of tags.

9. The method of claim 1, wherein at least a portion of the signature set corresponding to at least some of the plurality of tags is identified through application of stored administrator-provided rules defining criteria for determining a match to the plurality of tags.

10. The method of claim 1, further comprising retrieving administrator-provided signature-set tuning criteria and filtering the signature set according to the administrator-provided signature-set tuning criteria.

11. The method of claim 10, wherein the administrator-provided signature-set tuning criteria identify at least one of a signature accuracy level, a signature maturity level, or a signature filtering level.

12. The method of claim 10, wherein filtering the signature set comprises disabling, based on the administrator-provided signature-set tuning criteria, at least some signatures in the signature set.

13. The method of claim 1, wherein the enabling comprises storing the at least one signature on a signature database, and wherein the signature database is accessible by a Web Application Firewall (WAF).

14. The method of claim 4, wherein the scanning comprises sending a request to the web server and receiving at least a portion of the set of web server information from the web server.

15. The method of claim 1, wherein the identifying is based on tags of the plurality of tags being linked in the tag database to information associated with the set of web server information.

16. The method of claim 1, further comprising: filtering the signature set based on one or several user-entered signature-set tuning attributes, and presenting the filtered signature set via an electronic interface for selection by the administrator.

17. The method of claim 1, further comprising: modifying a signature of the signature set based on one or several user-entered signature-set tuning attributes, and presenting at least a portion of the signature set including the modified signature via an electronic interface for selection by the administrator.

18. The method of claim 1, further comprising filtering the signature set according to administrator-provided signature-set tuning criteria indicating a relatively high level of filtering, by: identifying one or more additional signatures for addition to the signature set relevant to the web server based solely on the administrator-provided signature-set tuning criteria.

19. The method of claim 1, further comprising filtering the signature set according to administrator-provided signature-set tuning criteria indicating a relatively low level of filtering, by: identifying one or more signatures for removal from the signature set based on the administrator-provided signature-set tuning criteria.

20. The method of claim 1, further comprising retrieving administrator-provided signature-set tuning criteria and filtering the signature set according to the retrieved administrator-provided signature-set tuning criteria.

21. The method of claim 1, further comprising: extracting metadata from one or several signatures of the signature set to determine one or several signature characteristic levels associated with the one or several signatures, and filtering the signature set based on the one or several signature characteristic levels.

22. The method of claim 1, wherein the set of web server information identifies one or more elements selected from a group comprising a hardware module operating at the web server and a software module operating on the web server.

23. The method of claim 1, wherein a portion of the set of web server information is received from an input provided by a system administrator.

24. One or more non-transitory media having instructions which, when executed by one or more processors, cause the one or more processors to facilitate a plurality of operations, the operations comprising:

receiving, by a first server, a set of web server information comprising one or more configurations of the web server and/or one or more hardware components of the web server;
subsequent to receiving the set of web server information: normalizing, by the first server, the set of web server information to generate normalized web server information;
identifying a plurality of tags relevant to the web server via a comparison of the normalized web server information to tag data contained in a tag database;
determining that a minimum threshold number of tags, greater than one, associated with the web server are also associated with a particular firewall signature;
responsive at least to determining that the minimum threshold number of tags associated with the web server are also associated with the particular firewall signature: forming, by the first server, a signature set comprising the particular firewall signature;
receiving an administrator selection of at least one signature of the signature set; and
enabling the at least one signature of the signature set for filtering of received web requests.

25. The one or more non-transitory media of claim 24, wherein the instructions when executed by the one or more processors further cause the one or more processors to filter a received web request based on at least part of the signature set.

26. The one or more non-transitory media of claim 24, wherein the set of web server information is configured to identify one or more elements selected from a group comprising a hardware component in the web server and a software component operating on the web server.

27. The one or more non-transitory media of claim 24, wherein the forming comprises generating a particular signature set, corresponding to at least some of the plurality of tags, based on: one or several component attributes of the web server, one or more user-entered preferences, or a combination of the one or several component attributes of the web server and the one or more user-entered preferences.

28. The one or more non-transitory media of claim 24, wherein the operations further comprise:
identifying one or more signatures relevant to the web server;
filtering the signature set based on administrator-provided signature-set tuning criteria, one or several of the plurality of tags, and the one or more signatures; and
modifying the signature set utilizing the one or more signatures.

29. The one or more non-transitory media of claim 24, further comprising: after the receiving of the set of web server information and prior to the normalizing, transmitting the set of web server information to a suggestion module.

30. A system having one or more processors configured to facilitate a plurality of operations, the operations comprising:
receiving, by a server, a set of web server information comprising one or more configurations of the web server and/or one or more hardware components of the web server;
subsequent to receiving the set of web server information: normalizing, by the server, the set of web server information to generate normalized web server information;
identifying a plurality of tags relevant to the web server via a comparison of the normalized web server information to tag data contained in a tag database;

determining that a minimum threshold number of tags, greater than one, associated with the web server are also associated with a particular firewall signature;

responsive at least to determining that the minimum threshold number of tags associated with the web server are also associated with the particular firewall signature: forming, by the server, a signature set comprising the particular firewall signature;

receiving an administrator selection of at least one signature of the signature set; and enabling the at least one signature of the signature set for filtering of received web requests.

31. The system of claim 30, wherein the server comprises a reverse proxy server including a Web Application Firewall (WAF), and wherein the server is configured to filter a received web request with the WAF based on at least part of the signature set.

* * * * *